Oct. 9, 1962 J. P. WAGNER 3,057,556
THERMOSTATIC CONTROL VALVE
Filed June 23, 1958 2 Sheets-Sheet 1

Oct. 9, 1962 J. P. WAGNER 3,057,556
THERMOSTATIC CONTROL VALVE
Filed June 23, 1958 2 Sheets-Sheet 2

United States Patent Office 3,057,556
Patented Oct. 9, 1962

3,057,556
THERMOSTATIC CONTROL VALVE
Joseph P. Wagner, Knoxville, Tenn., assignor to Robertshaw-Fulton Controls Company, Richmond, Va., a corporation of Delaware
Filed June 23, 1958, Ser. No. 743,769
3 Claims. (Cl. 236—34.5)

This invention relates to thermostatic control valves and more particularly to valves of the type employed for controlling the circulation of a cooling medium through an automobile cooling system having a by-pass.

An object of this invention is to gradually diminish the amount of fluid by-passed as the temperature thereof increases.

Another object of this invention is to shut off the flow of fluid through a by-pass when the temperature of the fluid increases above a predetermined degree.

A further object of this invention is to prevent internal damage to the device caused by an increase in temperature above a predetermined level.

A further object of this invention is to permit relative movement between parts when one abuts a stationary section of the device.

Briefly stated, in accordance with one aspect of this invention, a generally cylindrical casing is provided having inlet openings and by-pass openings therein and another opening through which a main valve member is adapted for reciprocal movement. A power element, responsive to the temperature of fluid flowing through the casing, moves the main valve member between positions for controlling the flow of fluid therethrough. A by-pass valve member is carried by the main valve member and is used to control fluid flowing through the by-pass openings. An overrun mechanism is operatively connected between the main valve member and the by-pass valve member to allow relative movement therebetween when the by-pass valve member contacts the casing in its seated portion and an increase in temperature causes the power element to further move the main valve member.

Other objects and advantages of this invention will become apparent from the following description taken in connection with the accompanying drawings wherein.

Figure 1:
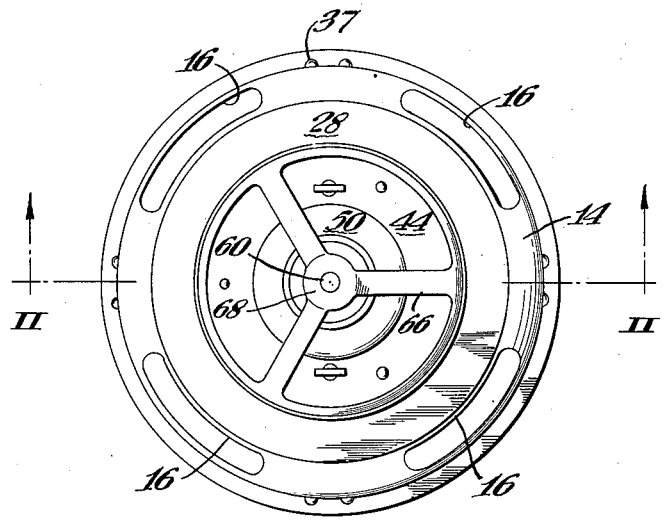
FIG. 1 is a plan view of an embodiment of this invention.
Figure 2:
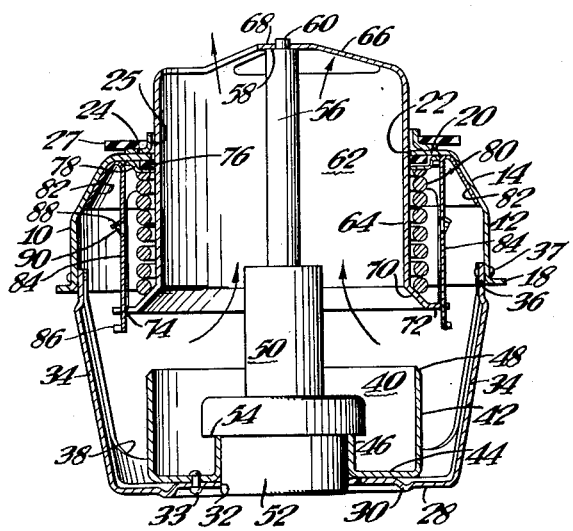
FIG. 2 is a cross-section along line II—II of FIG. 1.
Figure 3:
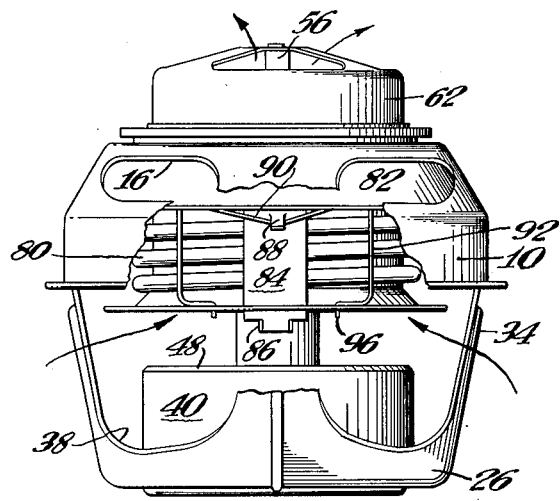
FIG. 3 is a side elevation view with parts broken away to show the internal construction.

Referring more particularly to the drawings, a casing member 10 is provided with a cylindrical side wall section 12 and a tapered or conically shaped side wall section 14. A series of apertures or by-pass openings 16 are formed in tapered section 14 through which a coolant fluid may pass. Casing member 10 is provided with an end wall 20 which has a center aperture 22 formed therein of a diameter less than that of side wall portions 12 and 14. A small flange 18 extends outwardly from the lower portion of cylindrical side walls 12 and lends rigidity to casing member 10.

A gasket retaining ring 24 is attached to end wall 20 by spot welding and has a central aperture 25 formed therethrough which is of slightly greater diameter than aperture 22 in end wall 20. The gasket retaining ring 24 is adapted to receive an annular gasket 27. When the thermostatic control valve is installed in a system, the gasket retaining ring 24 prevents gasket 27 from being compressed and expanding inwardly to interfere with the operation of the valve.

Another casing member 26 is provided and is formed with an end wall 28 which has an annular channel 30 formed therein to give rigidity to casing 26. A central aperture 32 is formed in end wall 28 and is in substantial alignment with aperture 22. Extending upwardly from the bottom section of casing member 26 are four channelled support arms 34 having relatively flattened ends 36 formed thereon which are connected to side wall 12 by a plurality of rivets 37. Between arms 34 and casing member 10, four openings 38 are formed through which fluid may flow into the interior of the generally cylindrical or tubular casing formed by joining casing members 10 and 26 together.

A cup-shaped valve seat member 40 is formed with a side wall 42 and a bottom wall 44 which is connected by a plurality of rivets 33 to end wall 28 of casing 26. The bottom wall 44 has a central opening therethrough defined by a coaxial upstanding annular flange 46 with the axis thereof aligned with that of apertures 32 and 22. An inclined valve seat 48 is formed on the marginal edge of wall 42.

A power element 50, responsive to temperatures of the surrounding medium, has a cylindrical end portion 52 which is press-fitted into flange 46 and is supported by a shoulder 54 formed on power element 50 which abuts the edge of the flange 46. The power element 50 has an actuating stem 56 projecting from the upper end thereof and is provided with a shoulder 58 and an axially disposed nipple 60. The actuating stem 56 moves relative to the end portion 52 of the power element 50 in response to temperature changes thereof.

A main valve member 62 is formed with side wall portion 64 having spider arms 66 extending inwardly from one end thereof and terminating in a hub 68. Valve member 62 is loosely mounted on actuating stem 56 by inserting nipple 60 into a hole formed in hub 68. The end face of valve member 62 opposite hub 68 has an outwardly extending section 70 of tapered or frustoconical configuration which terminates in an annular flange 72 having a pair of oppositely disposed slots 74 formed therein.

An annular seal ring 76 is provided to prevent leakage between the valve member 62 and the walls of aperture 22. Seal ring 76 is held in place by a thin sheet metal retainer 78 underlying the end wall 20 and engaging the outer surface of valve member 62.

Because of the loose mounting between the valve member 62 and actuating stem 56, it will readily be apparent that the stem 56 is operative to effect movement of valve member 62 in one direction only. To maintain valve member 62 in operative engagement with power element 50, it is necessary to provide a return spring 80 for biasing of valve member 62 in a direction opposite to movement caused by power element 50. The return spring 80 comprises a compression spring having a helical coil which at one end thereof abuts seal retaining ring 78. The other end of spring 80 is in engagement with the outer surface of flange section 70. When the stem 56 withdraws in response to a decrease in temperature, spring 80 acting against valve member 62 will cause corresponding movement thereof.

A by-pass valve member 82 is disposed within the casing and is adapted to cooperate with tapered walls 14 to control the flow of fluid through by-pass openings 16. Valve member 82 has a tapered or frusto-conical configuration, the outer surface of which is adapted to abut the inner surface of wall 14. A pair of arms 84, spaced at diametrically opposite positions, extend downwardly from valve member 82 and have tabs 86 bent out from the lower ends thereof. Arms 84 have a slight arcuate bend therein because of the general curvature of valve member 82 and are slidably disposed within slots 74 of flange 72, which are also slightly arcuate in form.

Two generally inverted U-shaped springs are provided having cross-bars 90 and legs 92 connected thereto. Legs 92 have in turn bent-in sections 94 and tip sections 96 connected thereto. These springs act as overrun means and are disposed within the casing with cross-bars 90 being held under tabs 88 bent out of arms 84, and tips 96 extending through apertures formed in flange 72 in such a manner that sections 94 rest on the upper surface of flange 72. Springs 90 are in compression and urge arms 84 upwardly until tabs 86 contact the under surface of flange 72 and prevent further upward movement. It is readily apparent with this connection that by-pass valve member 82 is operatively carried by main valve member 62 yet can move relative thereto by further compression of overrun springs 90.

Figure 4:
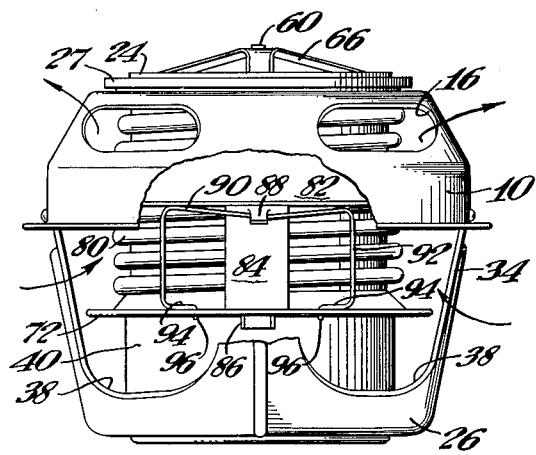
FIG. 4 is a view similar to FIG. 3 showing the parts in another position.

In operation, when the fluid enters the casing through inlet apertures 38 and is relatively cool, the temperature responsive power element 50 will be in an unexpanded condition and the main valve member 62 will be in the position shown in FIG. 4 wherein valve member 62 and valve seat member 40 are engaged because of the bias of return spring 80. Fluid is prevented from flowing from the inlet openings 38 into the interior of valve member 62. However, fluid is able to flow through inlet openings 38 through the casing and out through by-pass openings 16 which, because valve member 82 is in an open position, are in communication with the interior of the casing.

As the temperature of the circulating fluid increases, stem 56 of power element 50 will extend upwardly whereupon valve member 62 will move against the bias of spring 80 and section 70 will be disengaged from valve seat 48. Fluid will pass from inlets 38 into the interior of valve member 62 and out through the openings formed between spider arms 66, hub 60, and side wall 64. Further increases in temperature will cause valve member 62 to move by-pass valve member 82 upwardly until it engages the inner walls of tapered section 14. At this point, the fluid will be prevented from flowing through by-pass openings 16 and all the fluid flowing through the casing will pass from inlet openings 38 through the interior of valve member 62.

Further increases in temperature will cause stem 56 to continue upward movement of valve member 62 causing springs 90 to be compressed between flange 72 and tabs 88. Because valve member 82 abuts casing 10, a relative movement will occur between valve members 62 and 82 to prevent damage.

As power element 50 cools off, stem 56 will be withdrawn permitting return spring 80 to move valve member 62 downwardly at the rate at which stem 56 withdraws into power element 50. From the overrun condition, valve member 62 will move downwardly until flange 72 contacts tabs 86 whereupon further downward movement of main valve member 62 causes by-pass valve member 82 to move therewith. This movement will open by-pass openings 16 and permit any fluid flowing through the system at this time to also flow through by-pass openings 16. This downward movement will continue until tubular valve member 62 engages valve seat member 40.

It is understood that many changes may be made in the combination and arrangement of parts and in the details of construction within the scope of the appended claims without departing from the invention disclosed herein.

I claim:

1. In a thermostatic control valve, the combination comprising a generally cylindrical casing having a first end wall with an aperture therein, a second end wall, and a side wall with at least one by-pass opening and an inlet opening therein, an annular valve seat member supported by said second end wall and extending inwardly into the casing, a main sleeve valve member movable between positions relative to said valve seat member and having a seating surface cooperable therewith for controlling a flow of fluid from said inlet opening through said main valve member and having an outward flange extending from said seating surface and being provided with slot means, a temperature responsive power element mounted coaxially on said valve seat member and operatively connected to said main valve member for controlling movement thereof in one direction, a by-pass tubular valve member having an end and an opposite end and coaxial with but laterally spaced from said main valve member and cooperable at said one end with said side wall for controlling a flow of fluid from said inlet opening through at least one by-pass opening, said by-pass valve member having arm means depending from said opposite end and passing through said slot means and having abutting and lost motion means in engagement with said main valve member at said outward flange, resilient means connected to said main valve member at said outward flange and operatively engaging said arm means adjacent said opposite end to move said by-pass valve member in unison with the movement of said main valve member for a predetermined distance and to stop said by-pass member upon further movement of said main valve member, and a return spring between said main valve member and said by-pass valve member and acting on said main valve member.

2. In a thermostatic control valve, the combination comprising a tubular casing having one end wall formed with an aperture therein and a second end wall, a side wall formed in said casing having a plurality of by-pass openings therein and an inlet opening, an annular valve seat member carried by said second end wall and extending inwardly into said casing, a main sleeve valve member movable between positions relative to said valve seat member and having a seating surface cooperable therewith for controlling a flow of fluid through said casing, a temperature responsive power element mounted coaxially on said valve seat member and operatively connected to said main valve member for controlling movement thereof in one direction, a coil spring encompassing said main valve member from adjacent said seating surface to said casing side wall and being operative for controlling movement thereof in the opposite direction, a flange formed on said main valve member adjacent said seating surface, a by-pass tubular valve member encompassing said coil spring and being movable between positions relative to said side wall for controlling a flow of fluid through said by-pass openings, actuating arm means carried by said by-pass valve member and having sliding and abutting engaging means cooperating with said flange for causing said by-pass valve member to move with said main valve member for a predetermined distance and to stop said by-pass member upon further relative movement of said main valve member, and overrun spring means connected between said arm means and said flange for controlling relative movement between said by-pass valve member and said flange.

3. In a thermostatic control valve, the combination comprising a generally cylindrical casing having one end wall formed with an aperture therein and a second end wall, a side wall formed in said casing having by-pass openings and inlet openings therein, an annular valve seat member mounted on said second end wall and extending inwardly into said casing, a main sleeve valve member movable between positions relative to said valve seat member and having a seating surface cooperable therewith for controlling a flow of fluid from said inlet opening through said main valve member, a flange formed integral with said main valve member adjacent said seating surface, a temperature responsive power element mounted coaxially on said valve seat member and operatively connected to said main valve member for controlling movement thereof in one direction, a coil spring encompassing said main valve member from adjacent said seating surface to said casing side wall and being operative for controlling movement thereof in the opposite direction, a by-pass tubular valve member encompassing said coil spring and being movable for cooperation with said casing side wall for controlling a flow of fluid through said by-pass openings, a pair of oppositely disposed actuating arms carried by said by-pass valve member for causing movement of said by-pass valve member between positions in response to movement of said main valve member, said arms having sliding engaging means cooperating with said flange for limiting movement of said arms with respect to said flange and for causing said by-pass member to move with said main valve member for a predetermined distance and to stop said by-pass member upon further movement of said main valve member, and a pair of overrun springs connected between said arms and said flange for controlling relative movement between said by-pass valve member and said main valve member.

References Cited in the file of this patent

UNITED STATES PATENTS

| | | |
|---|---|---|
| 1,784,063 | Giesler | Dec. 9, 1930 |
| 2,489,209 | Watkins | Nov. 22, 1949 |
| 2,538,212 | Raney | Jan. 16, 1951 |
| 2,754,062 | Von Wangenheim | July 10, 1956 |
| 2,778,576 | Johnston | Jan. 22, 1957 |
| 2,829,835 | Branston | Apr. 8, 1958 |
| 2,833,478 | Middleton | May 6, 1958 |